May 9, 1967 YVES-JEAN F. BRETTE 3,319,234
MATRIX MEMORY DEVICE
Filed June 12, 1963 2 Sheets-Sheet 1

Inventor:
Yves-Jean Francois Brette
BY Baldwin & Wight
Attorneys

May 9, 1967 YVES-JEAN F. BRETTE 3,319,234

MATRIX MEMORY DEVICE

Filed June 12, 1963 2 Sheets-Sheet 2

Inventor:
Yves-Jean Francois Brette
BY Baldwin & Wight
Attorneys 3,319,234

MATRIX MEMORY DEVICE

Yves-Jean François Brette, Sevres, France, assignor to Compagnie des Machines Bull (Société Anonyme), Paris, France Filed June 12, 1963, Ser. No. 287,442
Claims priority, application France, June 22, 1962, 901,591
6 Claims. (Cl. 340—174)

The present invention relates to matrix memory devices for the permanent storage of binary data, which generally have a fairly large capacity and by means of which one of many words recorded can be instantly delivered on command. By permanent storage is meant the introduction of a repertory of words, which is effected at the time of the construction of the device.

Such devices have many applications in electronic computers. The commonest applications include the memory for programme instructions and the memory for data written in accordance with a combination code. These data may be simply numerical values, values of functions, sums or products of two digits or numbers, representations of characters, etc.

In accordance with another aspect of the possible applications, the device according to the invention may be employed as an encoding device or as a pulse-generating device in parallel with a number of output terminals, in accordance with one of a number of predetermined encoded configurations.

It is generally required of a permanent memory that it should have a zero or almost zero access time, that is to say, that only an insignificant delay time should exist between the instant when the selective interrogation order is applied and the instant when the output signal is available. Moreover, the repetition frequency must be very high. Finally, it is important that the cost of the memory, as also its overall dimensions, should be as small as possible.

The invention has for its object to design a permanent storage device which conforms to the requirements as to cost and overall dimensions better than do the devices previously employed.

Accordingly, in accordance with the invention, there is provided a matrix memory device for the permanent storage of binary data, for example, of N words each having *n* binary positions, this device being composed of a number *n* of columns or binary positions. Each column consists of a transformer element possessing a common multiturn secondary winding wound on a rectilinear core of soft ferrite. For each of the N words to be stored, there is provided a word winding, each winding being composed of a current supply conductor which possesses magnetic couplings with the said elements by means of a turn, only for the positions in which a predetermined binary value (for example 1) is to be stored.

A rectilinear soft-ferrite core may be disposed between two consecutive storage cores in order to reduce the parasitic couplings between them.

Figure 1:
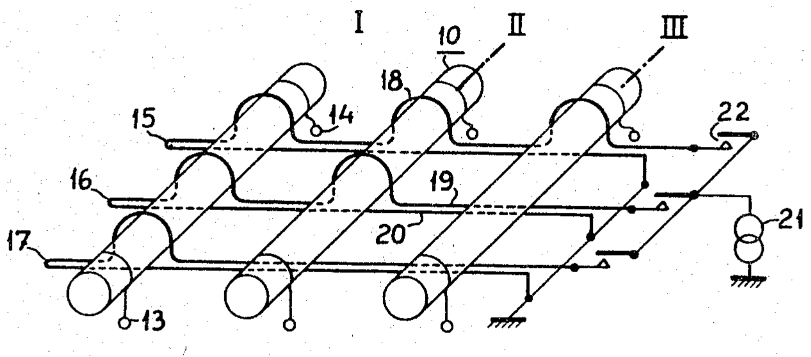
Figure 2:
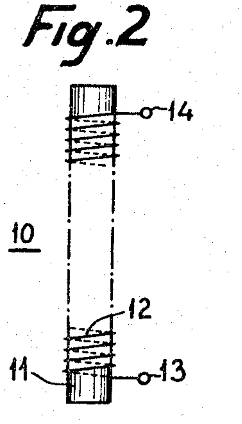
Figure 3:
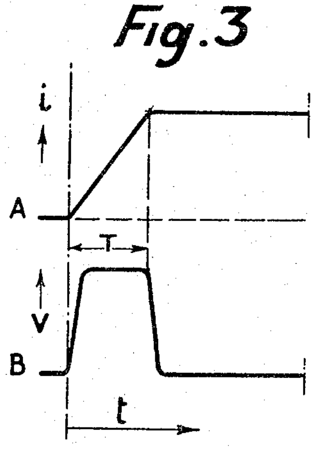
Figure 4:
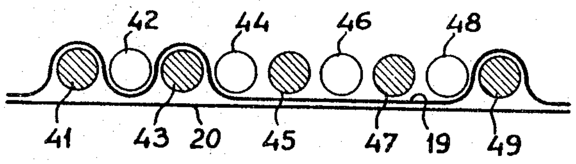
Figure 5:
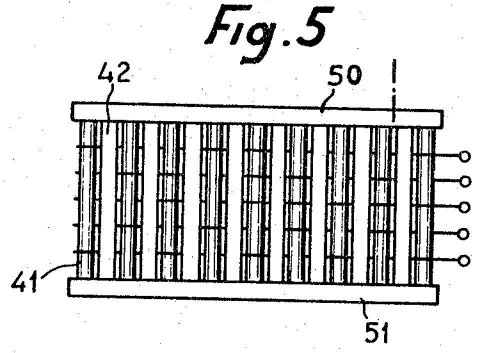
Figure 6:
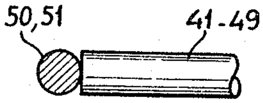
Figure 7:
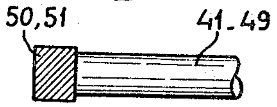
Figure 8:
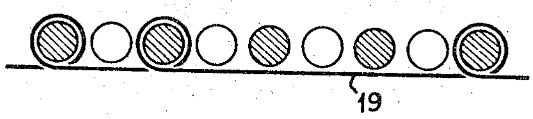
Figure 9:
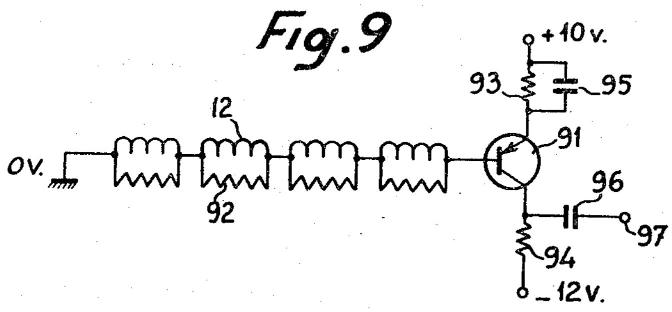

For a better understanding of the invention, and to show how it may be performed, the same will now be described, by way of example, with reference to the accompanying drawings, in which:

FIGURE 1 is a circuit diagram illustrating the principle of a permanent storage device according to the invention, FIGURE 2 illustrates the constitution of a core or transformer element, FIGURE 3 is a graph showing the relation between an output pulse (B) and the current (A) in a word winding, FIGURE 4 is a transverse section through a plurality of cores, FIGURE 5 is a plan view of a store, FIGURES 6 and 7 are two transverse sections through magnetic-circuit closing elements, FIGURE 8 is another section through a plurality of cores, and FIGURE 9 is a diagram showing the connection of a number of output secondary windings to a common amplifier.

In the following description, the permanent storage device will simply be called a "store." It is obvious that the storage capacity of such a store may vary within wide limits in accordance with the applications envisaged. For example, there is no difficulty in designing and using a store having a capacity of 64 words each having 20 or even 40 binary positions. However, FIGURE 1 shows a store designed to record three words having three binary positions, which is sufficient to explain the principles of construction.

The columns I, II and III correspond to three binary positions. For each column, there is provided a transformer element 10. This element is initially composed of a core 11 (FIGURE 2) and of a secondary winding 12. The core 11 is an elongated cylindrical prism. It consists of a ferrite of a soft type possessing high permability up to the very high-frequency range and having substantially no magnetic remanence. The secondary winding 12 is wound around the core. It comprises a relatively large number of turns, because a relatively high transformation ratio is aimed at. After winding of the secondary, the transformer element may be dipped into an adhesive or insulating varnish such as Araldite, so that the outer surfuce is smooth and of uniform diameter.

It may be assumed that all the homologous ends of the secondary windings, i.e. the terminals 13, will be connected to earth or to a reference potential, for example 0 volt. The output pulses will then be available across the output terminals 14 (FIGURES 1 and 2) of the secondary windings 12.

The transformer elements are disposed in parallel juxtaposition. The word windings are disposed perpendicularly to the direction of the cores. Of the word windings 15, 16 and 17, the winding 15 comprises three coupling turns, such as the turn 18, the winding 16 comprises two such turns, and the winding 17 one. In the preferred embodiment illustrated in FIGURE 1, it will be seen that when a current supply wire such as 19 does not comprise a coupling turn level with the core of a column, the wire simply passes below this core. The current return wires, such as 20, always pass below the cores which they cross. Any turn such as 18, although incompletely formed, perform the function of the primary winding of a voltage step-up transformer.

The word windings 15 to 17 may be selectively connected to a current generator 21 at the time of the closing of one of the switches 22. The current return conductors 20 have been shown as having an extremity connected to earth for the sake of simplicity. It will be seen in the following that this is not necessarily so, notably for the requirements of the economic selection of the word windings.

If it is assumed by convention that the existence of any primary turn represents the storage of a binary 1, it follows that the store contains the following: the word of the winding 15 contains 1's in the columns I, II and II, the word of the winding 16 contains 1's in the columns I and II, and the word of the winding 17 contains a 1 in the column I. Since the operation of the store is based upon the principle of the selection of transformers possessing primary coupling turns, it will be appreciated that it will be as a result of a current variation in the word winding selected that voltage pulses will be set up at the output terminals of the secondary windings, in the columns in which the binary 1 has been recorded during the construction.

By way of indication, the curve A of FIGURE 3 shows the curve representing the establishment of the current in a word winding. Since the amplitude of the output pulse depends essentially upon the factor *L.di/dt,* it is arranged that a substantially linear variation of the word current will be obtained. This variation may extend over a period of 150 to 200 nanoseconds, and may even be reduced, where necessary to 50 nanoseconds. The duration of the output pulses available at the secondary windings (curve B) is of the same order of magnitude. On the other hand, the duration and the amplitude of the said pulses are not very likely to vary owing to the configurations of 1 and 0 differing with the stored words. The amplitude of the output pulses commonly reaches 500 millivolts, i.e., they give rise to no problem in amplification by transistors before being transmitted to a buffer register, if any.

It will be obvious that the word current may be interrupted immediately after the period of time T (FIGURE 3). This obviously results in pulses of inverse polarity at the terminals of the same secondary windings. The latter pulses may be used or cancelled out in accordance with requirements.

The performance of the store (signal to noise ratio, output voltage) may be further enhanced by means of a number of improvements which will hereinafter be described. These improvements have the object of obtaining output pulses of higher amplitude and of minimising the reciprocal influences between neighbouring transformer elements.

Owing to the fact that the magnetic circuit of each storage core is not closed, the demagnetising field acquires some magnitude, whereby the coupling coefficient between the primary and secondary windings of each transformer is reduced. Moreover, when it is desired to minimise the spacing of the cores, a core having no excited primary turn may receive parasitic fluxes from a number of neighbouring cores, which may result in the occurrence of a spurious output pulse at the terminals of the corresponding secondary winding.

The solution adopted consists in disposing a so-called "screening" core between two successive storage cores. FIGURE 4 shows in transverse section a number of storage cores 41, 43, 45, 47, 49, which are shown hatched. The screening cores 42, 44, 46 and 48 are represented by unhatched circles. There may also be seen in FIGURE 5 a plurality of storage cores such as 41, and a plurality of screening cores such as 42. A screening core is also made of soft ferrite, and for reasons of homogeneity it may have the same form and the same dimensions as a storage core. However, this is not essential, and it is obvious that the screening core could be of square or rectangular section, for example.

In any case, as may be seen from FIGURE 4, a word winding 19 must pass below the screening cores if the turns are formed above the storage cores. In the illustrated example, a binary 1 is recorded only in the columns relative to the cores 41, 43 and 49. The above improvement makes it possible to double the amplitude of the output pulses, which may reach 1 volt for a maximum current of 50 ma. in a word winding.

The favourable effects are further increased if magnetic-circuit closing elements are disposed at the ends of the cores. Elements 50, 51 of this type may be seen in FIGURE 5. These are also made of soft ferrite. Their cross-section may be circular, as shown in FIGURE 6, or rectangular as shown in FIGURE 7.

An advantage of the permanent store according to the invention is that the mode of construction of the word windings may be adapted to the number of stores to be manufactured. Thus, for sufficiently large quantities, it is possible to design a mechanism or a machine for simultaneously winding all the word windings of a store. The programme adopted varies in accordance with the words to be recorded in the store. For example, in the case of 64 windings, these windings may start from the left-hand side. When the core 41 is in the position illustrated in FIGURE 4, which shows the first column, some of the wires are left flat for storing a zero. For the windings in which a 1 is to be stored, the corresponding wires are raised to the vertical position in order thereafter to permit the positioning of the core 41. The latter wires are thereafter lowered so as to form partial turns and to permit the positioning of the screening core 42. Thereafter, at the position of the second column, some of the wires are left flat and others, for the 1's, are raised as before for the positioning of the core 43, and the operations indicated are repeated until all the storage and screening cores have been positioned and all the turns have been formed as far as the last column.

In order to manufacture a small quantity of stores, manual winding of the word windings is entirely indicated. In this case, it may be appreciated that the storage cores and the screening cores are all positioned in parallel relationship in an assembly tool which maintains them at one of their ends. The word windings are then woven one after the other in accordance with the configuration of 1 and 0 peculiar thereto, by inserting them from the side of the free ends of the cores, as in the example illustrated in FIGURE 4.

It is to be noted that it is also possible not to run the current return conductors 20 close to the cores. They may even be entirely omitted.

Another mode of construction is suggested by FIGURE 8 for the successive manual winding of the word windings. In this case, a complete turn in formed with the wire 19 on the storage core of any column in which a binary 1 is to be stored. The screening cores may be positioned before or only after the winding of these windings.

By reason of the multiplicity of possible forms, the support by which the transformer elements and the conductors are finally held in position has not been shown. This support may be limited to an apertured Bakelite plate having recesses for the cores or terminals or terminal pins for the conductor wires.

It will readily be understood that the diagram given in FIGURE 1 is purely theoretical. In a practical construction, in order to obtain the required rapidity, transistors will perform the functions of the switches 22 and of the current generator 21. However, if a store is designed to record 64 words, for example, 64 switches will not be necessary. Since any word winding may be regarded as possessing an input and and output, the method of selection "from both sides" may be used, in the well known manner, as at present employed in the case of matrix memories composed of high-remanence magnetic cores.

For 64 windings, this method involves eight group switches on the input side and eight rank switches on the output side, and one diode per winding to avoid the undesirable return circuits.

Another advantageous feature of the permanent store according to the invention resides in that a number of stores may be associated with a common set of output amplifiers. It has been observed that it is possible to connect in series a number of secondary windings of columns of like rank without the amplitude of the output pulses being prohibitively reduced.

Thus, it may be seen in FIGURE 9 that up to four secondary windings 12 may be connected in series. A terminal of the output winding thus formed is connected to earth or to zero potential. The other terminal is connected to the base of the transistor 91. A resistor 92 of a thousand ohms can shunt each secondary winding individually. In the absence of output pulses, the transistor 91 of the PNP type is conductive and the current which it supplies is fixed by the emitter resistance 93, by the collector resistance 94 and by the supply voltages. When a positive output pulse is generated by one of the secondary windings 12, it is set up at the base of the transistor. By reason of the presence of the condenser 95, the potential of the emitter substantially does not vary and the supply of current to the transistor is consequently interrupted. Hence, a substantially rectangular pulse is set up across the terminals of the resistance 94. This pulse is transmitted by the condenser 96 to the output terminal 97 so as to be applied, where necessary, to a trigger circuit forming part of a buffer store.

As another practical data, it may be specified that in a 64-word store a storage core may consist of a cylindrical rod 1.6 mm. in diameter and 30 mm. long. The number of turns of the secondary winding may vary from 40 to 80 in accordance with the coefficient of permeability of the type of ferrite employed.

I claim:

1. A matrix memory device for the permanent storage of a number N of words, each of a number *n* of binary positions, composed of a number *n* of bit columns, comprising for each of said columns, a transformer with a cylindrical core made of non-remanent magnetic material and a multi-turn output secondary winding wound substantially on all the length of said core, said cores being parallel one to another and arranged in a plane, this device further comprising a number N of word windings substantially transverse to the length of said cores, each word winding including a return part of wire located on one side of said transformer cores and an active part of wire arranged to provide magnetic coupling turns on the other side of said cores only with the cores of the columns where a determined binary value is stored, and means for selectively applying a change of current intensity to one of said word windings whereby an output pulse appears across some of said secondary windings in the bit columns where the selected word winding has coupling turns.

2. An arrangement of several matrix memory devices according to claim 1, comprising for each bit column an amplifying circuit having an input terminal and a point of reference potential, the secondary windings of the several transformers allocated to a corresponding column being connected in serial relationship between said input terminal and said point of reference potential.

3. A matrix memory device as claimed in claim 1, comprising screening cores substantially analogous to said transformer cores, one screening core being located between two adjacent transformer cores and the active part of said wire being disposed on the same side of said screening cores as the said return part of wire.

4. A matrix memory device as claimed in claim 3, wherein two rectilinear cores are located at the ends of said transformer and screening cores to form closed magnetic circuits.

5. A read-only matrix memory for permanently storing a number N of words, each of a number *n* of binary positions, comprising a number *n* of bit columns, each column including a separate transformer with a cylindrical core made of a non-remanent magnetic material and an output multi-turn secondary winding wound substantially over the length of said core, said cores being parallel spaced, this matrix further comprising, allocated to each word to be stored, a word winding formed by a conductor arranged in a direction transverse to the length of said cores and wound to provide a primary loop around each of said transformer cores except around those cores pertaining to a column where a determined binary value is not stored, and means for selectively sending a current pulse in one of said word windings to read-out the stored word corresponding to the word winding thus selected.

6. A read-only matrix memory as claimed in claim 5, comprising screening cores substantially equivalent to said transformer cores which are located each between two transformer cores of adjacent columns, and two rectilinear cores made of a non-remanent magnetic material which are located at the ends of said transformer and screening cores.

References Cited by the Examiner

UNITED STATES PATENTS 3,137,795 6/1964 Newhall ------------ 340—174
3,146,381 8/1964 Moreau ----------- 340—174 X BERNARD KONICK, *Primary Examiner.*

L. G. KURLAND, *Assistant Examiner.*

Notice of Adverse Decision in Interference

In Interference No. 97,175 involving Patent No. 3,319,234, Y. J. F. Brette, MATRIX MEMORY DEVICE, final judgment adverse to the patentee was rendered Feb. 25, 1972, as to claims 1, 2 and 5.

[*Official Gazette August 22, 1972.*]